No. 876,936. PATENTED JAN. 21, 1908.
R. E. BRADWAY.
STARTING CLUTCH FOR EXPLOSIVE ENGINES.
APPLICATION FILED MAR. 20, 1907.
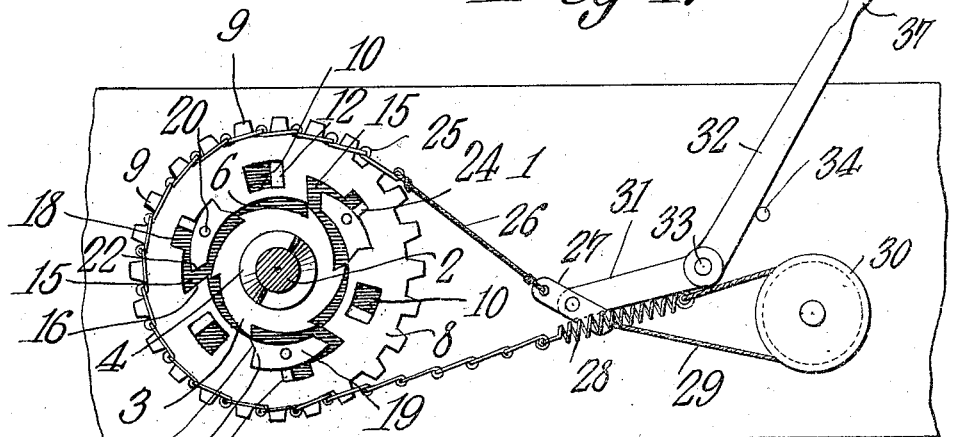
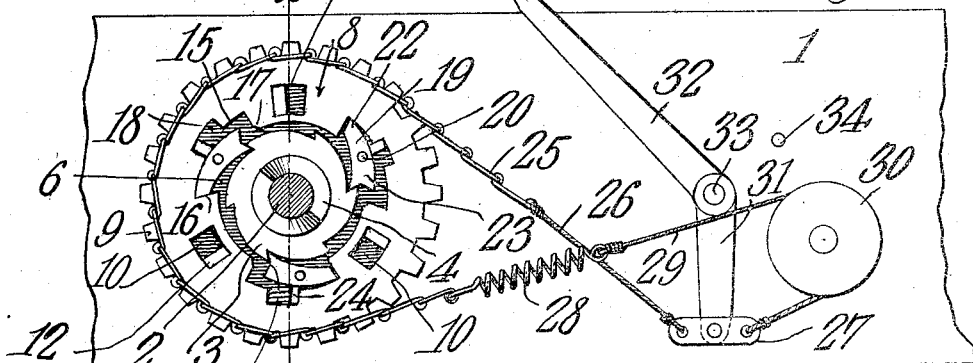
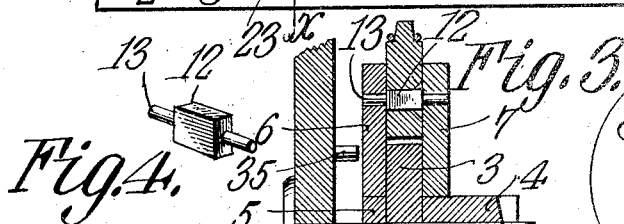
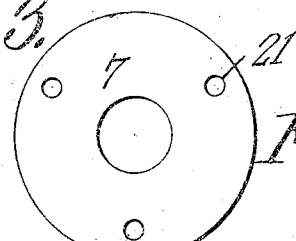
WITNESSES:
Robert E. Bradway,
INVENTOR.
By C. A. Snow & Co.
ATTORNEYS

UNITED STATES PATENT OFFICE.

ROBERT ELLSWORTH BRADWAY, OF STRAUGHN, INDIANA.

STARTING-CLUTCH FOR EXPLOSIVE-ENGINES.

No. 876,936.

Specification of Letters Patent.

Patented Jan. 21, 1908.

Application filed March 20, 1907. Serial No. 363,494.

*To all whom it may concern:*

Be it known that I, ROBERT ELLSWORTH BRADWAY, a citizen of the United States, residing at Straughn, in the county of Henry and State of Indiana, have invented a new and useful Starting-Clutch for Explosive-Engines, of which the following is a specification.

This invention has reference to improvements in starting clutches for explosive engines, and more especially for the engines of automobiles, whereby the engine may be started from the seat of the motor vehicle by a simple movement of a lever within reach of the driver of the vehicle.

The invention consists essentially in a clutch mechanism applied to the drive shaft of the engine with engaging dogs arranged to positively couple the members of the clutch together whereby motion may be manually transmitted to the engine to turn the same a sufficient number of times to insure the establishment of the cycle operations.

The construction of the clutch is such that a movement of the lever in one direction will cause the clutch members to be moved into engagement to rotate the engine shaft, while offering no resistance to the continued rotation of the engine shaft as soon as the explosions in the engine have been started; and the movement of the lever in the other direction will positively lock the engaging parts out of action, ready, however, to be moved into engagement as soon as the lever is again moved in the proper direction.

The invention will be fully understood from the following detailed description, taken in connection with the accompanying drawings forming part of this specification, in which,—

Figure 1 is a side view, partly in section and with certain parts removed, showing the clutch in the disengaged position; Fig. 2 is a similar view showing the clutch in the engaged position with parts in the extreme position of adjustment opposite to that shown in Fig. 1; Fig. 3 is a section on the line *x—x* of Fig. 2; Fig. 4 is a detail perspective view of a fixed stop member; and Fig. 5 is a rear face view of a cap plate covering one side of the clutch.

Referring to the drawings, there is shown a structure 1 which may be one side of the vehicle body, or a specially located strut under the vehicle body and near the floor thereof, or, in the case of motor vehicles having longitudinally arranged drive shafts, this structure 1 may extend crosswise of the body. Extending through the structure 1 is the power shaft 2 of the explosive engine or engines mounted upon the vehicle.

The shaft 2 has fast thereon a toothed drum 3 to one side of which extends a clutch head 4 by means of which the engine shaft may be started by a suitable crank if the starting device should break. On the other side of the drum 3 there is formed a hub 5 which may either be formed in one piece with the drum 3 or may be separately attached to the shaft 2. The drum 3, clutch 4 and hub 5 are all fixed to the shaft for rotation therewith.

Mounted upon the hub 5 there is an annulus 6 and mounted upon the cylindrical body of the clutch 4 there is an annular cap plate 7, the annulus 6 and cap plate 7 being spaced by the drum 3 and both extending beyond the edge or periphery of the drum 3.

Within the space between the annulus 6 and the cap plate 7 there is located a ring or annulus 8 having sprocket teeth 9 formed on its periphery, and at equi-distant points this annulus 8 is formed with segmental slots 10 to receive the enlargements or heads 12 of retaining pins 13 fast at appropriate points in the annulus 6 and cap plate 7. The heads 12 are of less thickness than the length of the slots 10 so that the annulus 8 may have a limited rotative movement with relation to the annulus 6 for a purpose which will hereinafter appear.

At points between those portions of the annulus 8 containing the slots 10, the annulus 8 is provided with recesses 15 opening toward the drum 3 and having one end wall inclined, as shown at 16, and the other end wall approximately radial or chamfered at the edge nearest the drum 3, as indicated at 17. The outer wall of each slot 15 is provided with another radial, outwardly-extending slot 18.

Seated in the slots or recesses 15 are segmental pawls 19 having pivots formed by bolts 20 extending through the annulus 6 and also through perforations 21 in the cap plate 7. The bolts 20 serve to secure the annulus 6 and cap plate 7 and the intermediate parts together. One end 22 of each pawl is beveled to fit the beveled end 16 of its recess 15, while the other end 23 of each pawl is provided with an angular notch fitting it to the chamfered end of the recess 15. Each pawl is provided with a lug or tongue 24 entering the recess or slot 18 in the outer wall of the recess 15.

Engaging the teeth 9 of the annulus 8 is a sprocket chain 25 having one end attached by a flexible connection 26 to a link 27 and the other end connected by a spring 28 to a flexible connection 29 passing over a pulley 30 mounted upon the member 1 and ultimately connecting with the other end of the link 27 from that to which the flexible connection 26 is attached. The link 27 is pivotally carried by an arm 31 projecting from a lever 32 at an angle thereto, and the pivot point 33 of the lever is located at the angle of junction between the arm 31 and the lever 32. A stop 34 appropriately located on the member 1 limits the movement of the lever 32 in one direction. Another stop 35 on the member 1 in the path of a stop pin 36 on the annulus 6 prevents a complete rotation of the annulus 8 carried by said annulus 6.

The handle 37 of the lever 32 will, in practice, be located within easy reach of the driver of the motor vehicle.

Now, let it be assumed that the lever 32 is in the position shown in Fig. 1, which will be its normal position, and that it is desired to start the engine. The lever 32 is moved toward the left as viewed in Fig. 1. This operation will cause the annulus 8 to be moved the distance around the annulus 6 permitted by the length of the slots 10. This movement is sufficient to cause the beveled ends 22 of the pawls 19 to engage the beveled walls 16 of the recesses 15. These beveled ends 22 will thereupon ride along the beveled walls 16 which will cause the pawls to turn upon their pivots 20, thus moving the other ends 23 of the pawls into the path of the teeth on the periphery of the drum 3. A continued movement of the lever 32 imparting rotative movement to the annulus 8 will cause the pawls 19 to rotate the drum 3 with the annulus 8 and thus cause the rotation of the shaft 2 and the consequent starting of the explosive engine in the usual manner.

If the engine be of the type requiring two revolutions of the shaft 2 to produce the first explosion in the engine cylinder, the stops 35 and 36 may be omitted and the chain 25 may be of sufficient length and the parts may be so proportioned that the movement of the lever 32 will impart two or more complete revolutions to the shaft 2. With other types of engines, however, this is not necessary, and one rotative movement of the annulus 8, or, in fact, under some circumstances, even less than a complete rotative movement of the annulus 8 will be sufficient for the purpose and the parts may be proportioned accordingly. The engine having been started, the drum 3 will rotate with its teeth riding under the pawls. Now, in returning the lever 32 to its initial position the annulus 8 will be moved upon the annulus 6 for the distance permitted by the length of the slots 10. Before, however, this movement is quite completed, the lugs 24 on the pawls 19 are engaged by one of the walls of the slots 18 and these pawls are moved upon their pivots to bring their ends 23 out of the path on the teeth of the drum 3 and into engagement with the chamfered end walls of the recesses 15, where they are held by the conjoint action of these end walls and the engagement of the corresponding end walls of the slots 18 with the lugs 24.

So long as the lever 32 remains in the initial position the pawls are safely locked out of the path of the teeth on the drum 3 and any movement of these teeth in a direction liable to engage the pawls, as, for instance, when the engine stops at which time it is liable to reverse its direction of rotation for at least a partial revolution, will be harmless and there is therefore no danger of either breaking the pawls or stripping the teeth from the drum 3.

The spring 28 serves to take up any slack that might occur in the chain 25 and the connections 26 and 29 due either to the manipulation of the device or the stretching of the parts, and the chain is therefore always maintained in a taut condition.

I claim:—

1. In a clutch, a toothed driven member, a second member, pawls carried by the latter and each having one end arranged for engagement with the toothed member, and a third member carried by the second member and having a limited movement relative thereto and provided with means for engaging the pawls to force them into engagement with the toothed member and other means for engaging the pawls to force them out of engagement with the toothed member, said third member being provided with means for the application of power, and transmitting such power directly to the pawls carried by the second member, and through said pawls to the first or driven member.

2. In a clutch, a toothed driven member, a drive member, pivoted pawls carried by the drive member and each having one end beveled and the other end notched, and another member carried by the drive member and having a limited movement relative thereto and provided with seats for the pawls arranged to receive the notched ends thereof when moved in one direction and to engage the beveled ends thereof when moved in the other direction.

3. In a clutch, a toothed driven member, a drive member, pivoted pawls carried by the drive member and each having one end notched and the other end beveled and also provided with a projecting lug, and another member carried by the drive member and having a limited movement relative thereto and provided with seats for the pawls adapted to receive the notched ends thereof when moved in one direction and to engage the beveled ends thereof when moved in the other direction and provided with means for engaging the lugs on the pawls to hold the latter out of operative relation with the toothed driven member.

4. In a clutch, a toothed driven member, a drive member, pawls carried by the drive member, a pawl-operating member provided with segmental slots, and headed retaining devices on the drive member and extending through the slots in the pawl-operating member.

5. In a clutch, a toothed driven member, a drive member, pawls pivotally supported on the drive member and having one end notched and the other end beveled and each provided with a projecting lug, a pawl-operating member having seats shaped to receive the pawls and engage their respective ends when moved in one direction or the other and to engage the lugs on the pawls to move the latter out of the path of the driven member and also provided with segmental slots, and headed retaining means carried by the drive member and extending through the segmental slots in the pawl operating member for holding the latter to the drive member and for permitting a limited relative movement between the pawl-operating member and the drive member.

In testimony that I claim the foregoing as my own, I have hereto affixed my signature in the presence of two witnesses.

ROBERT ELLSWORTH BRADWAY.

Witnesses:
ERNEST C. MODLIN,
WM. F. BRENNER.